United States Patent
Nowak et al.

(10) Patent No.: US 11,712,716 B2
(45) Date of Patent: Aug. 1, 2023

(54) CONFORMAL FLUOROPOLYMER COATINGS

(71) Applicant: THE BOEING COMPANY, Chicago, IL (US)

(72) Inventors: Andrew P. Nowak, Los Angeles, CA (US); April R. Rodriguez, Santa Monica, CA (US); Elena M. Sherman, Culver City, CA (US)

(73) Assignee: The Boeing Company, Arlington, VA (US)

(*) Notice: Subject to any disclaimer, the term of this patent is extended or adjusted under 35 U.S.C. 154(b) by 480 days.

(21) Appl. No.: 17/025,645

(22) Filed: Sep. 18, 2020

(65) Prior Publication Data
US 2021/0008593 A1    Jan. 14, 2021

Related U.S. Application Data

(62) Division of application No. 15/791,948, filed on Oct. 24, 2017, now abandoned.

(51) Int. Cl.
*B05D 7/00*     (2006.01)
*C09D 133/16*   (2006.01)
(Continued)

(52) U.S. Cl.
CPC ............... *B05D 7/50* (2013.01); *B05D 5/083* (2013.01); *B05D 7/52* (2013.01); *B05D 7/56* (2013.01);
(Continued)

(58) Field of Classification Search
CPC .......... C09D 5/00; C09D 7/20; C09D 175/04; B32B 37/10; B32B 37/1018;
(Continued)

(56) References Cited

U.S. PATENT DOCUMENTS 5,009,936 A * 4/1991 Yamanaka ......... C08G 18/6279
427/407.1
5,139,879 A 8/1992 Aharoni et al.
(Continued)

FOREIGN PATENT DOCUMENTS

CN    101618620 A    1/2010
CN    103625070 A    3/2014
(Continued)

OTHER PUBLICATIONS

GCC Patent Office Examination Report for Application No. GC 2018-36260 dated Sep. 9, 2020.
(Continued)

*Primary Examiner* — Carson Gross
(74) *Attorney, Agent, or Firm* — Patterson + Sheridan, LLP (57) ABSTRACT

Methods for forming a fluoropolymer coated component, such as a metal component, comprise applying an adhesion promoter onto a surface of the component; applying an organic material onto the adhesion promoter; and applying a mixture comprising a fluoropolymer and a solvent selected from a furan or a fluorinated solvent onto the organic material. Fluoropolymer coatings have a thickness of from about 5 mil to about 80 mil on a component, an average porosity of from about 20% to about 70% based on the total volume of the layer, and a void density of from about $10^{11}$ to about $10^{13}$ voids per $cm^3$.

21 Claims, 3 Drawing Sheets

(51) Int. Cl.

| | | |
|---|---|---|
| C09D 171/00 | (2006.01) | |
| C09D 127/16 | (2006.01) | |
| C09D 175/04 | (2006.01) | |
| C09D 7/20 | (2018.01) | |
| B05D 5/08 | (2006.01) | |
| B32B 1/00 | (2006.01) | |
| C09D 127/00 | (2006.01) | |
| B32B 37/10 | (2006.01) | |
| B32B 37/12 | (2006.01) | |
| B05D 1/02 | (2006.01) | |
| B29C 39/02 | (2006.01) | |
| B29C 43/02 | (2006.01) | |
| B32B 37/24 | (2006.01) | |

(52) U.S. Cl.
CPC ............ *B32B 1/00* (2013.01); *B32B 37/1018* (2013.01); *B32B 37/12* (2013.01); *C09D 7/20* (2018.01); *C09D 127/00* (2013.01); *C09D 127/16* (2013.01); *C09D 133/16* (2013.01); *C09D 171/00* (2013.01); *C09D 175/04* (2013.01); *B05D 1/02* (2013.01); *B05D 2503/00* (2013.01); *B05D 2504/00* (2013.01); *B05D 2506/10* (2013.01); *B05D 2518/10* (2013.01); *B05D 2518/12* (2013.01); *B29C 39/02* (2013.01); *B29C 43/02* (2013.01); *B32B 2037/243* (2013.01); *B32B 2309/02* (2013.01); *B32B 2309/025* (2013.01); *B32B 2309/105* (2013.01); *B32B 2309/12* (2013.01); *B32B 2311/00* (2013.01)

(58) Field of Classification Search
CPC ... B32B 37/025; B29C 66/81455; B05D 7/50; B05D 7/52; B05D 7/56; B05D 2503/00; B05D 2504/00
See application file for complete search history.

(56) References Cited

U.S. PATENT DOCUMENTS

| | | |
|---|---|---|
| 5,246,782 A | 9/1993 | Kennedy et al. |
| 6,168,866 B1 | 1/2001 | Clark |
| 6,517,940 B1 | 2/2003 | Millero et al. |
| 6,803,109 B2 | 10/2004 | Qiu et al. |
| 8,481,654 B2 | 7/2013 | Edelmann et al. |
| 8,992,207 B2 | 3/2015 | Dull et al. |
| 9,637,658 B2 | 5/2017 | Nowak et al. |
| 2007/0166469 A1 | 7/2007 | Snow et al. |
| 2008/0058489 A1 | 3/2008 | Edelmann et al. |
| 2009/0202782 A1 | 8/2009 | Cardoso et al. |
| 2009/0309260 A1 | 12/2009 | Keuchel |
| 2012/0076973 A1 | 3/2012 | Guzman et al. |
| 2012/0231107 A1 | 9/2012 | Waldrop et al. |
| 2013/0084434 A1 | 4/2013 | Kehrl et al. |
| 2014/0272111 A1 | 9/2014 | Bradford et al. |
| 2015/0191629 A1 | 7/2015 | Matsuda et al. |
| 2016/0009971 A1 | 1/2016 | Wang et al. |
| 2017/0002230 A1 | 1/2017 | Nowak et al. |
| 2017/0218209 A1 | 8/2017 | Yuan et al. |

FOREIGN PATENT DOCUMENTS

| | | |
|---|---|---|
| CN | 104870106 A | 8/2015 |
| DE | 102005004829 A1 | 8/2006 |
| EP | 0356992 A2 | 3/1990 |
| JP | S61162562 A | 7/1986 |
| JP | H7290637 A | 11/1995 |
| JP | 4876580 B2 | 2/2012 |
| JP | 2015209493 A * | 11/2015 |
| JP | 2015209493 A | 11/2015 |
| JP | 20171166 A | 1/2017 |
| WO | 9844545 A1 | 10/1998 |
| WO | 0206406 A2 | 1/2002 |
| WO | 2004024348 A1 | 3/2004 |
| WO | 2008051789 A1 | 5/2008 |
| WO | 2010137542 A1 | 12/2010 |
| WO | 2014099448 A2 | 6/2014 |
| WO | 2017149202 A1 | 9/2017 |

OTHER PUBLICATIONS

Li Hengde et al., "Dictionary of Modern Materials Science and Engineering," Edition 1, Shandong Science and Technology, dated Aug. 31, 2001, p. 586.
National Intellectual Property Administration, PRC, Notification of Second Office Action for Chinese Application 201811713481 dated Mar. 30, 2022.
European Patent Office, Communication pursuant to Article 94(3) EPC for Application 18 202 151.9-1103 dated Jun. 28, 2022.
State Intellectual Property Office of PRC, Notification of First Office Action for Application No. 201811713481 dated Dec. 10, 2021.
European Patent Office Notification of European Publication for Application No. 18202151.9-1103 / 3485987 dated Apr. 25, 2019.
Extended European Search Report for Application No. 18202151.9-1103/3485987 dated Jul. 18, 2019.
Paint and Surface Coatings: Theory and Practice, 2nd Ed.; Lambourne, R., Strivens, T. A., Eds.; William Andrew Pub. Norwich, NY, 1999 (Year: 1999).
Chinese Patent Office, Decision of Rejection for Application 201811171348.1 dated Jun. 14, 2022.
GCC Patent Office Examination Report for Application No. GC 2018-36260 dated Oct. 10, 2021.
GCC Patent Office Examination Report for Application No. GC 2018-36260 dated Sep. 12, 2020.
Notice of Reasons for Rejection for Japanese Application 2018-198831 dated Feb. 7, 2023.
European Patent Office Examination Report for Application No. 18 202 151.9-1103 dated Nov. 24, 2020.
Notice of Reasons for Rejection for Japanese Application 2018-198831 dated Jul. 19, 2022.

* cited by examiner

CONFORMAL FLUOROPOLYMER COATINGS

CROSS-REFERENCE TO RELATED APPLICATIONS

This application is a divisional of co-pending U.S. patent application Ser. No. 15/791,948, filed Oct. 24, 2017, which is herein incorporated by reference in its entirety.

FIELD

Aspects of the present disclosure provide methods for depositing conformal fluoropolymer coatings onto non-flat surfaces. Aspects of the present disclosure further provide fluoropolymer coatings.

BACKGROUND

Accumulation of frost, ice, or snow on aircraft changes airflow over aircraft wings, reducing lift and increasing drag. The accumulations also add to the total weight, increasing lift required for takeoff. Accordingly, frost, ice, or snow is normally removed prior to take-off. While in flight, hot engine bleed air, electric blankets, mechanical boots, or combinations thereof may be used to keep ice off exterior surfaces of aircraft. These measures, however, consume energy, add weight to the aircraft, and reduce fuel economy.

On the ground, anti-icing and de-icing fluids in the form of hot glycol sprays are used. While effective, such fluids generate an added expense and may cause gate delays from additional application time. As a result, new options for removing ice from aircraft are desirable.

Fluoropolymers can be coated onto a surface to reduce or prevent ice accumulation. However, where the aircraft part is not flat (e.g., has curvature), for example on a lead edge of an airfoil, the fluoropolymer coating has a rippled texture which wears much more quickly when exposed to rain or sand as compared to a smooth coating surface. Furthermore, the fluoropolymer coating has a maximum thickness of about 10 mils over the curved surface of the aircraft part because of creep/flow of the deposited coating.

There is a need for methods for forming smooth icephobic coatings on non-flat surfaces.

SUMMARY

The present disclosure provides methods for forming a fluoropolymer coated metal including applying an adhesion promoter onto a surface; applying an organic material onto the adhesion promoter; and applying a mixture comprising a fluoropolymer and a solvent selected from a furan or a fluorinated solvent onto the organic material.

Aspects of the present disclosure further provide fluoropolymer coatings having a thickness of from about 5 mil to about 80 mil on a component, an average porosity of from about 20% to about 70% based on the total volume of the layer, and a void density of from about $10^{11}$ to about $10^{13}$ voids per $cm^3$.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

The present disclosure provides methods for forming a fluoropolymer coated metal including applying an adhesion promoter onto a surface; applying an organic material onto the adhesion promoter; and applying a mixture comprising a fluoropolymer and a solvent selected from a furan or a fluorinated solvent onto the organic material. Methods of the present disclosure provide smooth icephobic coatings on non-flat surfaces, such as non-flat metal surface, with improved rain and sand erosion resistance.

Surface Preparation of Airfoil

Figure 1:
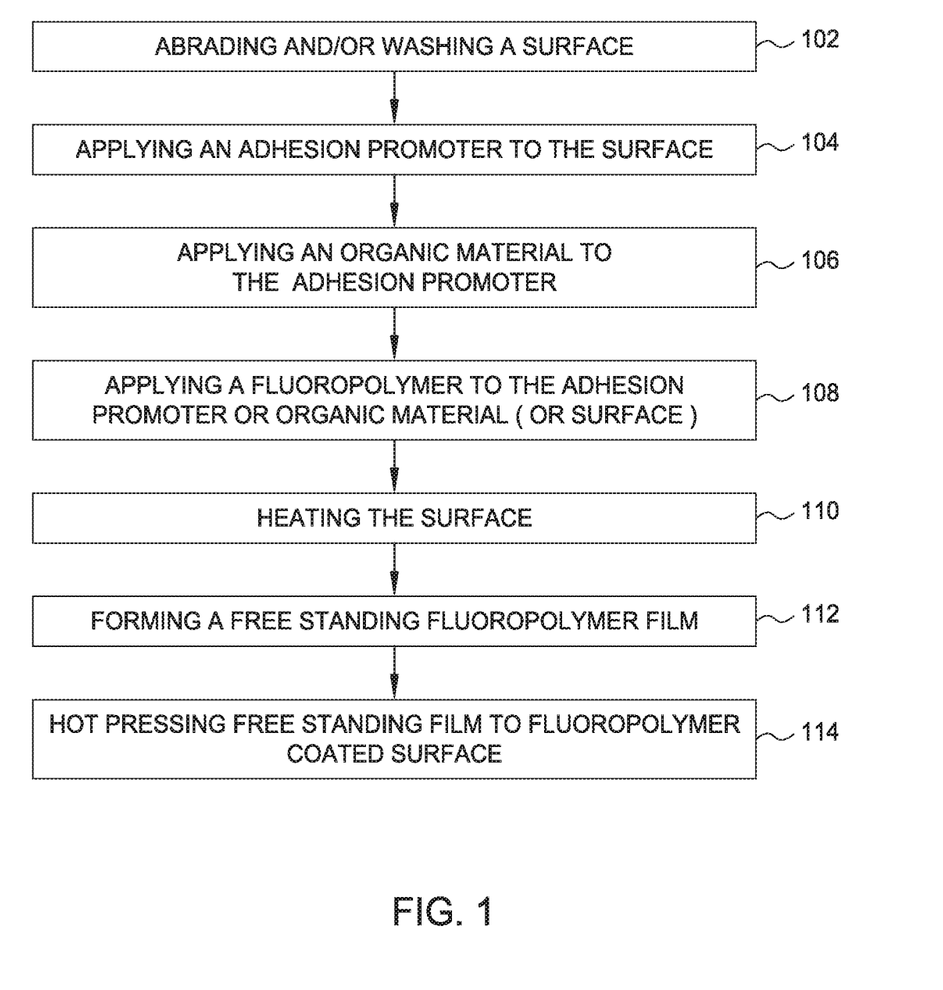
FIG. 1 is a flow diagram of a method for manufacturing surfaces having smooth icephobic coatings disposed thereon, according to one aspect.

FIG. 1 is a method 100 for manufacturing surfaces having smooth icephobic coatings disposed thereon. In at least one aspect, as shown in FIG. 1, a surface, such as a surface of a component, can be abraded and/or washed with a solvent (block 102). A component can be a part of a wind turbine, satellite, or a vehicle such as a car, a train, a boat, and the like. A vehicle component is a component of a vehicle, such as a structural component, such as landing gear(s), a panel, or joint, of an aircraft. Examples of a vehicle component include an airfoil (such as a rotor blade), an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component. In at least one aspect, a surface is abraded with an abrasion pad to provide an exposed surface. For example, an aluminum surface is abraded to remove oxidized aluminum and expose an elemental aluminum surface. In at least one aspect, an abrasion pad has an about 100 grit surface to about 1,000 grit, such as about 400 grit to about 500 grit. Suitable abrasion pads include Scotch-Brite™ abrasion pads available from 3M Corporation. An abraded surface can be washed with soap and water with scrubbing to remove any loose surface material or debris. After washing, the surface (such as a surface of a vehicle component) can be introduced into an alkaline solution containing a detergent. Additionally or alternatively, an alkaline solution containing a detergent can be sprayed on the surface. The alkaline solution can be aqueous sodium hydroxide, sodium bicarbonate, potassium carbonate, or sodium carbonate. A detergent can be Micro-90® detergent (which includes surfactants and chelators) available from International Products Corporation of Burlington, N.J. The pH of the alkaline solution containing a detergent can be from about 7 to about 12, such as about 9. The surface (such as a surface of a vehicle component) present in the alkaline solution having a detergent can be sonicated for about 1 minute to about 1 hour, such as about 20 minutes. The alkaline solution having a detergent provides additional removal of oxidation on the surface. The surface (such as a surface of a vehicle component) can then be removed from the solution, washed with water, and introduced into an acetone bath. The surface present in the acetone bath can be sonicated for about 1 minute to about 1 hour, such as about 20 minutes. The surface is removed from the acetone bath and dried. The surface can be stored under an inert atmosphere, such as nitrogen or argon, until further use.

A fluoropolymer can be applied to the abraded surface directly (for example, in the manner described below) or the abraded surface can undergo further surface preparation, for example, as described below.

Surface Preparation for Spray Application

In at least one aspect, as shown in FIG. 1, a metal adhesion promoter is applied to the surface (block 104) to enhance the bond of an organic material to the surface. In at least one aspect, the method includes applying an adhesion promoter that is the reaction product of acetic acid, zirconium tetra-n-propoxide, and (3-glycidyloxypropyl)trimethoxysilane. An adhesion promoter can be Boegel®, such as 3M Surface Pre-Treatment AC-131 CB. 3% AC-131 kit can be obtained from 3M Corporation. The adhesion promoter can be a layer on the surface. 3% AC-131 is a non-chromate conversion coating and is typically disposed on aluminum, nickel, stainless steel, magnesium, and titanium alloys. AC-131 has a Part A, which is an aqueous mixture of glacial acetic acid (GAA) and zirconium tetra-n-propoxide (TPOZ) and a Part B, which is (3-glycidyloxypropyl)trimethoxysilane (GTMS). The two components are mixed together (Part A+Part B) and the molar ratio of silicon to zirconium in the mixture is 2.77:1. A molar ratio of acetic acid to TPOZ in Part A is 0.45:1. The measured volumes of GAA and TPOZ can be mixed vigorously for about 10 minutes and then added to the Part A from the AC-131 kit. The premixed Part A solution can then be added to a measured volume of the Part B solution from the AC-131 kit and stirred followed by a 30 minute induction period. This solution is then disposed on the surface (such as a surface of a vehicle component) by spraying, immersing, brushing, and/or wiping. For example, suitable forms of spraying include spraying with a spray gun, high-volume, low-pressure spray gun, and/or hand pump sprayer. The solution is then cured (at room temperature or elevated temperature) to form a sol-gel. In at least one aspect, a curing temperature is from about 10° C. to about 150° C., such as from about 20° C. to about 100° C., such as from about 30° C. to about 70° C., such as from about 40° C. to about 50° C. Curing can be performed for a time period of from about 15 minutes to about 72 hours. An adhesion promoter layer can have a thickness of from about 0.5 mil to about 5 mil, such as from about 1 mil to about 2 mil.

In at least one aspect, as shown in FIG. 1, an organic material is deposited onto the adhesion promoter (block 106). The organic material can be a layer on the adjesion promoter. Organic material can include a primer such as an epoxy, a polyurethane, a primer material such as an epoxy or urethane primer, or a fiber-reinforced plastic. Depositing can include painting, spraying, immersing, contacting, adhering, and/or bonding sol-gel with the organic material to form an organic material layer. An organic material layer can have a thickness of from about 0.5 mil to about 5 mil, such as from about 1 mil to about 2 mil.

Spray Application of Fluoropolymer

In at least one aspect, as shown in FIG. 1, a fluoropolymer is deposited onto the adhesion promoter layer or the organic material layer or surface (e.g., metal surface) (block 108). Fluoropolymers include fluoroacrylates, fluorosilicone acrylates, fluorourethanes, perfluoropolyethers, perfluoropolyoxetanes, polyvinylidenefluouride (PVDF), and perfluoroalkoxy alkane (PFA). Fluoroethanes include polytetrafluoroethylene (PTFE), fluorinated ethylene propylene polymer (FEP) (which is a copolymer of hexafluoropropylene and tetrafluoroethylene), and ethylene tetrafluoroethylene (ETFE).

The surface (such as a surface of a vehicle component) can be suspended (such as by a clamp or ring) to allow easy access to two or more sides of the component while spraying.

The fluoropolymer is dissolved in one or both of a furan solvent or a fluorinated solvent. Typically, because of the amount of fluorine atoms of fluoropolymers, conventional spray and bonding deposition techniques cannot be used due to solvent incompatibility with the fluoropolymer. It has been discovered that a furan solvent or a fluorinated solvent provides polarity sufficient for dissolution (and flowability) of the fluoropolymer and a volatility low enough (i.e., boiling point high enough) for use in spray applications. In addition, the boiling point of a furan solvent or a fluorinated solvent is low enough to be readily removed from a fluoropolymer layer with minimal void formation which can provide a smooth, conformal surface of the fluoropolymer layer. In at least one aspect, a solvent has a boiling point of from about 40° C. to about 200° C., such as from about 50° C. to about 100° C., such as from about 60° C. to about 90° C.

In at least one aspect, a fluorinated solvent is represented by formula (I):

$$R^1\text{—}(CF_2)n\text{-}R^2 \qquad (I)$$

wherein n is an integer of from about 1 to about 25; $R^1$ and $R^2$ are independently —$CF_3$, hydrogen, hydroxyl, hydroxyalkyl, aminoalkyl, aminoaryl, aryloxy, alkyl, aryl, carboxylic acid groups having from about 1 to about 25 carbons, carbonyl, ketone, aldehyde, and —$CF_3(CF_2)q(CH_2)p$, wherein q is an integer of from about 0 to about 25, and p is an integer of from about 1 to about 25, wherein the fluorinated solvent has a boiling point from about 40° C. to about 200° C. Unlike fluoropolymers of the present disclosure, most compounds are not soluble in fluorinated solvents. For example, many organic molecules and many non-fluorinated or partially fluorinated compounds, are not soluble in fluorinated solvents.

In at least one aspect, a furan solvent is represented by formula (IIa) or (IIb):

(IIa)

(IIb)

wherein $R^1$, $R^2$, $R^3$ and $R^4$ are independently hydrogen, hydroxyl, hydroxyalkyl, aminoalkyl, aminoaryl, aryloxy, alkyl, aryl, carboxylic acid groups having from about 1 to about 25 carbons, carbonyl, and alkyl ketone carbonyl, wherein the furan solvent has a boiling point from about 40° C. to about 200° C.

Comparatively, methylethylketone does not dissolve fluoropolymers. Furthermore, fluoropolymers have limited solubility in chlorinated solvents, such as chloroform and dichloromethane, because these solvents are not polar enough and cannot disperse the fluoropolymer. In addition, the volatility of most chlorinated solvents, such as dichloromethane, is too high for spray applications.

A mixture can further comprise one or more additional polymers such as epoxies, polyacrylates, polyesters, polyethers, carbamates (such as polyurethanes), and polysiloxanes. Polyurethanes, for example, can include DESOTHANE® HS CA8800/6900 available from PPG Aerospace of Sylmar, Calif. and ECLIPSE® (ECL-G-7) available from Akzo Nobel Aerospace Coatings in Waukegan, Ill., both of which are solvent gloss clear coats.

A mixture of a fluoropolymer and a solvent of the present disclosure can have a viscosity from about 0.00046 Pa*s to about 1 Pa*s at 25° C. as determined by ASTM D445-17a, such as from about 0.001 Pa*s to about 0.8 Pa*s at 25° C. as determined by ASTM D445-17a. A mixture of a fluoropolymer and a solvent of the present disclosure can provide a viscosity sufficiently high, such as 0.00046 Pa*s or greater, to coat non-flat surfaces, such as non-flat metal surfaces, conformally (e.g., conformal deposition onto a curved surface of a vehicle component). The conformal coating has a substantially uniform thickness across the surface.

After the fluoropolymer is dissolved in one or both of a furan solvent or a fluorinated solvent, the fluoropolymer solution is sprayed onto the adhesion promoter layer or the organic material layer using any suitable spray apparatus, such as an airbrush. In at least one aspect, during spraying, a nozzle of the spray apparatus is separated from the surface of the adhesion promoter layer or the organic material layer at a distance of from about 0.5 inch to about 30 inches, such as from about 2 inches to about 10 inches, such as from about 4 inches to about 8 inches, which is a distance sufficiently close to the surface to provide spraying at a controlled location of the surface. In at least one aspect, the fluoropolymer solution is sprayed onto the adhesion promoter layer or the organic material layer at a pressure of from about 7 psi to about 24 psi, such as from about 12 psi to about 18 psi. Other sprayer/pressure options can include: HVLP/LVLP from about 10 psi to about 60 psi; Air brushes from about 20 psi to about 50 psi; Hydraulic sprayers from about 500 psi to about 2000 psi; Robotic sprayers from about 100 to about 1000 psi.

The nozzle of the spray apparatus is moved parallel to the surface of the adhesion promoter layer or the organic material layer. Two full movements of the nozzle parallel to the surface ("there and back") of the adhesion promoter layer or the organic material layer is referred to as one "pass". One pass can deposit the fluoropolymer solution onto the surface at a thickness of from about 0.5 mil to about 2 mil, such as from about 0.8 mil to about 1.2 mil, such as about 1 mil. A time period from one pass to a subsequent pass can be from about 0.1 minute to about 30 minutes, such as from about 0.5 minute to about 5 minutes, such as from about 1 minute to about 2 minutes. Providing time in between passes promotes solvent removal from layers deposited by individual passes. This layer by layer spray approach allows solvent to evaporate from each layer instead of evaporating solvent from one thick layer, which would create voids. After several passes, a fluoropolymer layer is formed having a thickness of from about 2 mil to about 20 mil, such as from about 5 mil to about 15 mil, such as from about 8 mil to about 12 mil. The fluoropolymer layer can be cured at room temperature for a time period of at least about 10 hours, such as at least about 15 hours, such as at least about 16 hours. Alternatively, curing can be expedited by heating the fluoropolymer layer at a temperature from about 20° C. to about 100° C., such as from about 30° C. to about 90° C., such as from about 40° C. to about 80° C. Curing can be performed for a time period of from about 15 minutes to 5 hours, such as about 4 hours.

In at least one aspect, a fluoropolymer layer of the present disclosure has an average porosity of from about 20% to about 70%, such as from about 40% to about 60%, such as from about 45% to about 55%, based on the total volume of the layer, as determined by mercury intrusion, which can provide a smooth, conformal surface of the fluoropolymer layer. In at least one aspect, a fluoropolymer layer of the present disclosure has an average void density of from about $10^{11}$ to about $10^{13}$ voids per cm$^3$, such as from about $2 \times 10^{11}$ to about $8 \times 10^{12}$ voids per cm$^3$, as determined by Mercury Intrusion Test (ASTM D4284-12), which can provide a smooth, conformal surface of the fluoropolymer layer. In at least one aspect, a fluoropolymer layer of the present disclosure has a surface roughness of less than about 100 microinches, such as less than about 90 microinches, such as less than about 80 microinches, such as less than about 70 microinches, such as from about 5 microinches to about 100 microinches, such as from about 20 microinches to about 80 microinches, as determined by ASTM D7127-05 (Standard Test Method for Measurement of Surface Roughness of Abrasive Blast Cleaned Metal Surfaces Using a Portable Stylus Instrument). The smooth fluoropolymer layers of the present disclosure can provide stable laminar flow of water over the fluoropolymer layer.

In at least one aspect, a second fluoropolymer layer is deposited onto the first fluoropolymer layer in a similar or the same way as the first fluoropolymer layer. A fluoropolymer solution is sprayed onto the first fluoropolymer layer using any suitable spray apparatus, such as an airbrush. During spraying, a nozzle of the spray apparatus is separated from the surface of the first fluoropolymer layer at a distance of from about 0.5 inch to about 30 inches, such as from about 2 inches to about 10 inches, such as from about 4 inches to about 8 inches. The fluoropolymer solution is sprayed onto the first fluoropolymer layer at a pressure of from about 7 psi to about 24 psi, such as from about 12 psi to about 18 psi. Other sprayer/pressure options can include: HVLP/LVLP from about 10 psi to about 60 psi; Air brushes from about 20 psi to about 50 psi; Hydraulic sprayers from about 500 psi to about 2000 psi; Robotic sprayers from about 100 to about 1000 psi. The nozzle of the spray apparatus is moved parallel to the surface of the first fluoropolymer layer. One pass can deposit the fluoropolymer solution onto the surface at a thickness of from about 0.5 mil to about 2 mil, such as from about 0.8 mil to about 1.2 mil, such as about 1 mil. A time period from one pass to a subsequent pass can be from about 0.1 minute to about 30 minutes, such as from about 0.5 minute to about 5 minutes, such as from about 1 minute to about 2 minutes. Providing time in between passes promotes solvent removal from layers deposited by individual passes. This layer by layer spray approach allows solvent to evaporate from each layer instead of evaporating solvent from one thick layer, which would create voids. After several passes, the second fluoropolymer layer is formed having a thickness of from about 2 mil to about 20 mil, such as from about 5 mil to about 15 mil, such as from about 8 mil to about 12 mil. The second fluoropolymer layer can be cured at room temperature for a time period of at least about 10 hours, such as at least about 15 hours, such as at least about 16 hours. Alternatively, curing can be expedited by heating the fluoropolymer layer at a temperature from about 20° C. to about 100° C., such as from about 30° C. to about 90° C., such as from about 40° C. to about 80° C. Curing can be performed for a time period of from about 15 minutes to 5 hours, such as about 4 hours.

Figure 2:
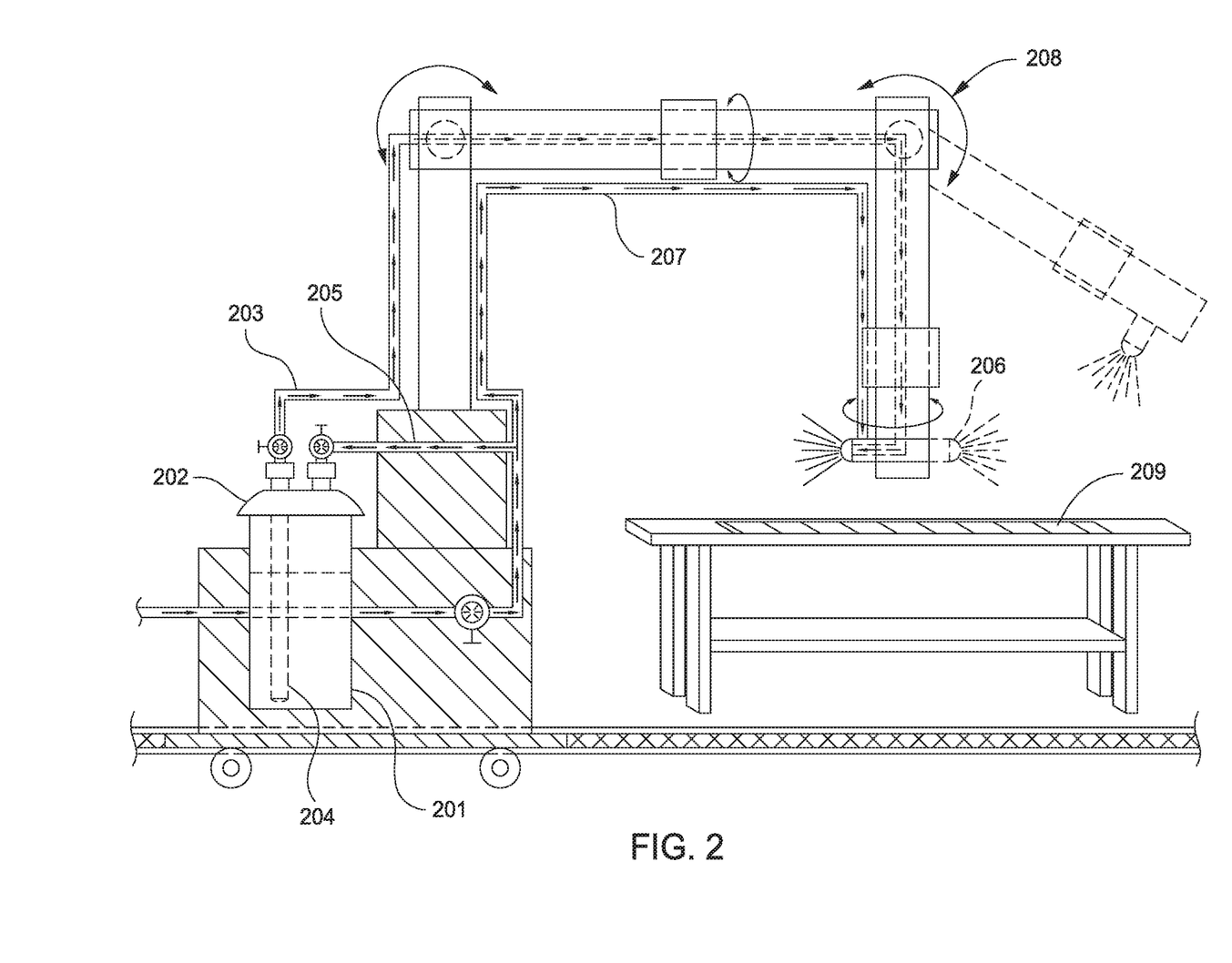
FIG. 2 is a robotic sprayer, according to one aspect.

In at least one aspect, the spray apparatus for depositing the first fluoropolymer layer, the second fluoropolymer, the adhesion promoter, and/or the organic material is a robotic sprayer. FIG. 2 is a robotic sprayer. As shown in FIG. 2, a material (such as a mixture of fluoropolymer and solvent) is charged to a pressure pot 201 with a disposable polyethylene liner. The lid 202 is installed and clamped pressure tight. A fluid delivery hose 203 is connected to the pickup tube 204 inside the pressure pot. Pressure regulated nitrogen or dry air is injected through line 205 to pressurize the pot and force material into the pickup tube and line. The pressure pot has pressure relief valves to prevent over pressurization and to bleed pressure from the pot for removing or adding the material. A regulator is located near the gun 206 to control the fluid pressure being delivered. Controlling the fluid pressure at the gun controls the volumetric flow rate through the gun's spray nozzle. Installing the regulator near the gun eliminates any pressure drop influence from hose length, hose diameter, or robot arm height. Nozzle control is also needed to control flow rates. Slight manufacturing variances in the nozzle orifice can result in different liquid flow rates. Nozzle control and fluid pressure regulation at the gun work in conjunction to give consistent and repeatable volumetric flow rates through the nozzle. The air assist atomization pressure through line 207 also is regulated and controlled to give consistent spray dispersion from the nozzle.

The robot 208 carries the gun and is programmed to traverse across the surface of the component with a constant offset from the non-flat surface 209 and a controlled velocity. The spray from the nozzle typically has a flat fan pattern. Most of the spray material is deposited at the center of the fan with tapering amounts delivered at the fan edges. To compensate for this nonuniform distribution in the spray fan, the robot is programmed to overlap adjacent passes to even out the distribution. Typical pass indexing is ¼ fan width.

In at least one aspect, as shown in FIG. 1, method 100 includes heating the surface (such as a surface of a vehicle component) before, during, and/or after depositing fluoropolymer onto the surface (block 110). For example, heating the surface while depositing fluoropolymer onto the surface can provide in-situ solvent removal and increased viscosity of the mixture containing fluoropolymer and solvent, providing conformal deposition onto a curved (non-flat) surface of a vehicle component. Heating the surface while depositing fluoropolymer onto the surface can provide additional uniform layers of fluoropolymer to achieve an overall thicker coating (e.g., 10 mil to 20 mil) with reduced or eliminated voids caused by trapped solvent because the solvent has been removed. Heating the surface while depositing fluoropolymer onto the surface further provides smoother layers as compared to room temperature cured layers. The conformal coating has a substantially uniform thickness across the surface. During heating, a surface (such as a surface of a vehicle component) can have a temperature of from about 30° C. to about 70° C., such as from about 45° C. to about 55° C., as determined by any suitable thermocouple contacting the surface, such as a Type K or Type J thermocouple. Heating a surface can be performed using light exposure (e.g., ultraviolet light) of a surface. The light can be infrared (IR) or ultraviolet (UV). Exposing a surface to light (and heating) can be performed using a FUSION UV curing unit fitted with a H+ bulb with a maximum emmittance at 365 nm. In at least one aspect, the bulb of the UV/IR curing unit is oriented about 45° relative to the flow direction of material flowing from the nozzle of the spray apparatus. In at least one aspect, the bulb of the UV/IR curing unit is separated from the surface at a distance of from about 8 inches to about 3 feet, such as about 11 inches to about 1.5 feet. An IR curing unit, for example, provides a smooth surface texture of the coating which would otherwise have a more rippled effect, providing improved durability of the surface against rain and sand erosion.

Forming a Free Standing Film

In at least one aspect, as shown in FIG. 1, method 100 includes forming a free standing fluoropolymer film (block 112). A mixture of a fluoropolymer and one or both of a furan solvent or a fluorinated solvent, as described above, is sprayed onto the a mylar sheet, such as silanized mylar, using any suitable spray apparatus, such as an airbrush. In at least one aspect, during spraying, a nozzle of the spray apparatus is separated from a surface of the mylar sheet at a distance of from about 0.5 inch to about 30 inches, such as from about 2 inches to about 10 inches, such as from about 4 inches to about 8 inches. In at least one aspect, the fluoropolymer solution is sprayed onto the mylar sheet at a pressure of from about 7 psi to about 24 psi, such as from about 12 psi to about 18 psi. Other sprayer/pressure options can include: HVLP/LVLP from about 10 psi to about 60 psi; Air brushes from about 20 psi to about 50 psi; Hydraulic sprayers from about 500 psi to about 2000 psi; Robotic sprayers from about 100 to about 1000 psi. The nozzle of the spray apparatus is moved parallel to the surface of the mylar sheet. Two full movements of the nozzle parallel to the surface ("there and back") of the mylar sheet is referred to as one "pass". One pass can deposit the fluoropolymer solution onto the surface at a thickness of from about 0.5 mil to about 2 mil, such as from about 0.8 mil to about 1.2 mil, such as about 1 mil. A time period from one pass to a subsequent pass can be from about 0.1 minute to about 30 minutes, such as from about 0.5 minute to about 5 minutes, such as from about 1 minute to about 2 minutes. Providing time in between passes promotes solvent removal from layers deposited by individual passes. This layer by layer spray approach allows solvent to evaporate from each layer instead of evaporating solvent from one thick layer, which would create voids. After several passes, a fluoropolymer layer is formed having a thickness of from about 2 mil to about 20 mil, such as from about 5 mil to about 15 mil, such as from about 8 mil to about 12 mil. The fluoropolymer layer can be cured at room temperature for a time period of at least about 10 hours, such as at least about 15 hours, such as at least about 16 hours. Alternatively, curing can be expedited by heating the fluoropolymer layer at a temperature from about 20° C. to about 100° C., such as from about 30° C. to about 90° C., such as from about 40° C. to about 80° C. Curing can be performed for a time period of from about 15 minutes to 5 hours, such as about 4 hours.

In at least one aspect, a second fluoropolymer layer is deposited onto the first fluoropolymer layer to form a free standing film in a similar or the same way as the first fluoropolymer layer. A fluoropolymer solution is sprayed onto the first fluoropolymer layer using any suitable spray apparatus, such as an airbrush. In at least one aspect, during spraying, a nozzle of the spray apparatus is separated from the surface of the first fluoropolymer layer at a distance of from about 0.5 inch to about 30 inches, such as from about 2 inches to about 10 inches, such as from about 4 inches to about 8 inches. In at least one aspect, the fluoropolymer solution is sprayed onto the first fluoropolymer layer at a pressure of from about 7 psi to about 24 psi, such as from about 12 psi to about 18 psi. Other sprayer/pressure options can include: HVLP/LVLP from about 10 psi to about 60 psi; Air brushes from about 20 psi to about 50 psi; Hydraulic sprayers from about 500 psi to about 2000 psi; Robotic sprayers from about 100 to about 1000 psi. The nozzle of the spray apparatus is moved parallel to the surface of the first fluoropolymer layer. One pass can deposit the fluoropolymer solution onto the surface at a thickness of from about 0.5 mil to about 2 mil, such as from about 0.8 mil to about 1.2 mil, such as about 1 mil. A time period from one pass to a subsequent pass can be from about 0.1 minute to about 30 minutes, such as from about 0.5 minute to about 5 minutes, such as from about 1 minute to about 2 minutes. After several passes, the second fluoropolymer layer is formed having a thickness of from about 2 mil to about 20 mil, such as from about 5 mil to about 15 mil, such as from about 8 mil to about 12 mil. The second fluoropolymer layer can be cured at room temperature for a time period of at least about 10 hours, such as at least about 15 hours, such as at least about 16 hours. Alternatively, curing can be expedited by heating the fluoropolymer layer at a temperature from about 20° C. to about 100° C., such as from about 30° C. to about 90° C., such as from about 40° C. to about 80° C. Curing can be performed for a time period of from about 15 minutes to 5 hours, such as about 4 hours.

The free-standing film can be hot pressed at a temperature of from about 90° C. to about 150° C., such as about 100° C. In at least one aspect, two platens are heated to the desired temperature (e.g., 100° C.). The free-standing film is placed between two release layers (e.g., silanized mylar) and placed in between the hot platens. The hot platens are then closed providing pressure and heat on the film. The thermoplastic will flow and the thickness of the film can be controlled with the use of shims. The platens are then cooled down before pressure is removed. The temperature chosen for hot pressing is dependent on the thermoplastic or polymer film. In at least one aspect, the temperature of the platens is above the Tg (glass transition temperature) of the polymer but below the decomposition temperature.

Bonding of Free Standing Film to Fluoropolymer Coated Surface

In at least one aspect, as shown in FIG. 1, method 100 includes bonding the free standing film to the fluoropolymer coated surface (block 114). An adhesive can be applied to one or both of an exposed (e.g., outer) fluoropolymer surface of the free standing film or an exposed (e.g., outer) fluoropolymer surface of the fluoropolymer coated component. The adhesive can be pressed with pressure onto one or both of the fluoropolymer surface of the free standing film or the fluoropolymer surface of the fluoropolymer coated component to reduce or eliminate air content between the adhesive and the applied surface. Adhesives include any suitable adhesive such as an epoxy, such as AF163-2K obtained from 3M Corporation. If the adhesive is applied to the fluoropolymer surface of the free standing film, a protective liner on the opposite surface of the adhesive is then removed and positioned over the fluoropolymer surface of the fluoropolymer coated component and then pressed with pressure onto the fluoropolymer surface of the fluoropolymer coated component. If the adhesive is applied to the fluoropolymer surface of the fluoropolymer coated component, a protective liner on the opposite surface of the adhesive is then removed and positioned over the fluoropolymer surface of the free standing film and then pressed with pressure onto the fluoropolymer surface of the free standing film.

Figure 3:
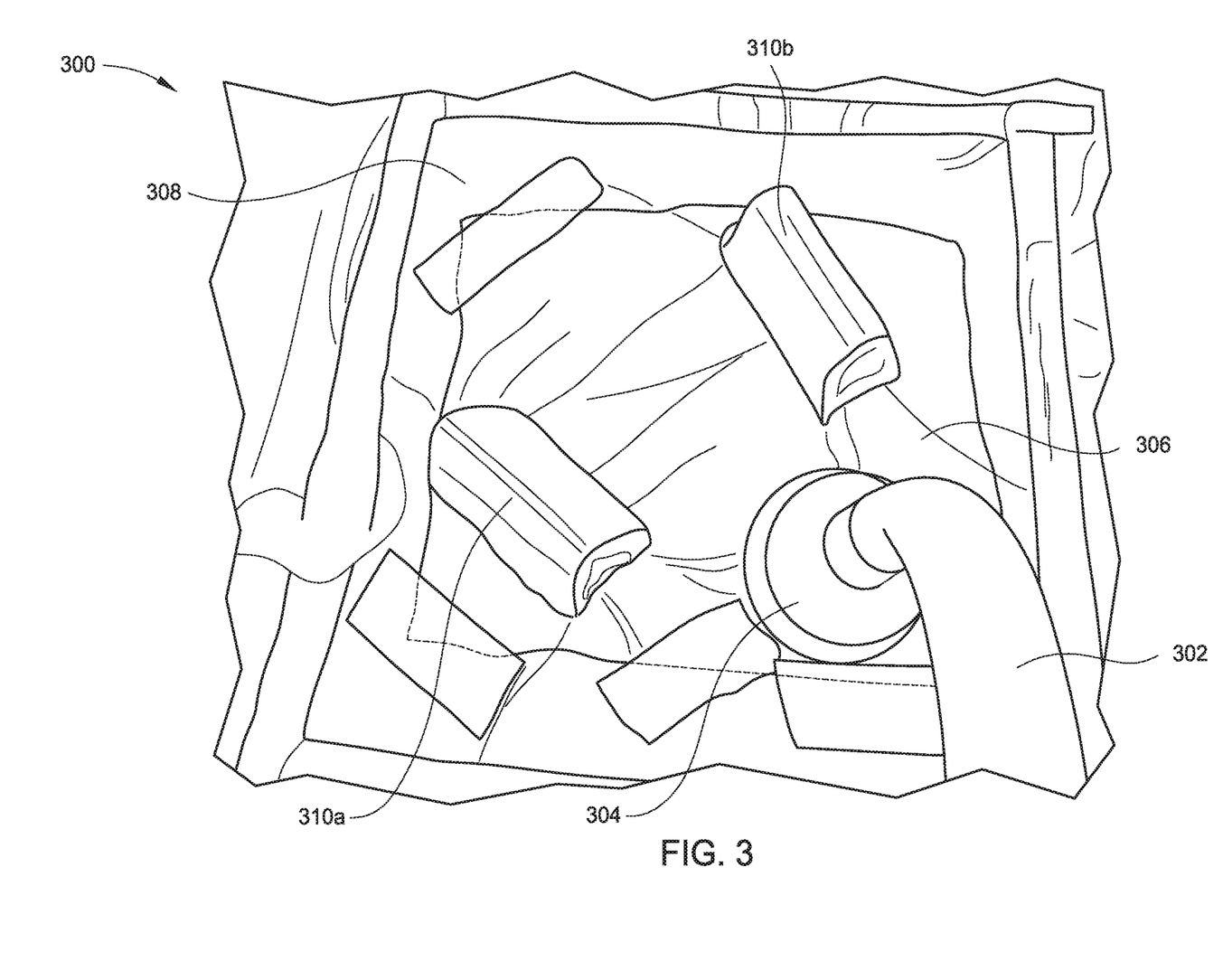
FIG. 3 is a perspective view of a vacuum bag apparatus, according to one aspect.

The entire (pressed) assembly is then sealed in a vacuum bag. FIG. 3 is a perspective view of a vacuum bag apparatus 300. As shown in FIG. 3, includes vacuum hose 302 connected to vacuum seal 304. Vacuum seal 304 is connected to vacuum bag 306. Vacuum bag 306 is disposed on metal plate 308 and two assemblies shown at locations 310a and 310b. Metal plate 308 provides improved vacuum efficiency. The metal plate can be a flat metal plate and can comprise aluminium or stainless steel. It has been discovered that without the metal plate coupled to the vacuum bag, the vacuum bag wraps freely around the assembly creating voids and/or creases in the bag which, depending on the location of the creases and/or pleats, can affect the coating texture on the assembly.

A vacuum is applied to bag 306 ensuring contact with the free standing film to the fluoropolymer coated metal of the assembly. A pressure inside bag 306 during a vacuum bagging process can be from about 1 psi to about 20 psi, such as from about 7 psi to about 10 psi. Once air is substantially or completely removed from the bond line between the free standing film and the fluoropolymer coated metal of the assembly, the bagged assembly is transferred to an oven to cure the adhesive (of the pressed assembly). A temperature of the oven can be from about 100° F. to about 300° F., such as from 150° F. to about 250° F., for example about 210° F. A temperature ramp rate can be from about 1° F./minute to about 20° F./minute, such as about 2° F./minute. Curing can be performed for a time period of from about 15 minutes to 5 hours, such as about 3 hours. After curing, excess film (if present) can be trimmed from the edges of the component. The vacuum bag can contain one or more breather materials, such as a porous cotton material, disposed within the vacuum bag. Breather material provides connection of the vacuum to the assembly surface.

After a vacuum bagging procedure, the assembly can have a fluoropolymer layer having a thickness of from about 5 mil to about 80 mil, an average porosity of from about 20% to about 70% based on the total volume of the layer, and a void density of from about $10^{11}$ to about $10^{13}$ voids per $cm^3$, as determined by Mercury Intrusion Test (ASTM D4284-12). In at least one aspect, a fluoropolymer layer of the present disclosure has a surface roughness of less than about 100 microinches, such as less than about 90 microinches, such as less than about 80 microinches, such as less than about 70 microinches, such as from about 5 microinches to about 100 microinches, such as from about 20 microinches to about 80 microinches, as determined by ASTM D7127-05 (Standard Test Method for Measurement of Surface Roughness of Abrasive Blast Cleaned Metal Surfaces Using a Portable Stylus Instrument). The smooth fluoropolymer layers of the present disclosure can provide stable laminar flow of water over the fluoropolymer layer.

Additives for Improving Coating Behavior

While adding additives to paints and coatings is common knowledge in the industry, it is important to retain the anti-ice performance of the coating. Many additives can be used to produce smoother finishes, better wetting of the surface being coated and better resistance to environmental effects and conditions such as moisture, heat and UV exposure. Some of these additives work by modifying the surface energy of the coating composition which can alter the microstructure of any incompatible chemistry composition of the technology. The microstructure and phase separation of the incompatible chemistries is important to having high anti-ice performance and should not be altered significantly.

These additives may also migrate to the surface of the coating which can change how ice interacts with the surface of the coating which can also effect freezing delays and ice adhesion.

The chemical nature of the components in the coating technology readily absorb moisture from the environment, which may cause premature curing of the coating and the production of carbon dioxide. To mitigate this issue, moisture scavengers (e.g. oxazolidines such Incozol-2) can be added to the mixtures of fluoropolymer and solvent of the present disclosure. To improve surface wetting and spreading of the coating on the component, a wetting agent (e.g., block copolymers such as Disperbyk-166 which is a high molecular weight block copolymer with pigment affinic groups) and/or defoamer (e.g. BYK-051N, which is a silicone-free defoamer) can be included in a mixture of fluoropolymer and solvent of the present disclosure. These additives are not particulates, but are small molecule additives. They are moisture scavengers or reduce void formation. Lower amount of voids promotes the integrity/strength of the film. Voids can be observed macroscopically using microscopy.

Additives of the present disclosure include any suitable moisture scavenger, wetting agent, and/or defoamer. Moisture scavengers can include isophorone diisocyanate (IPDI) and oxazolidines (such as 4-Ethyl-2-methyl-2-(3-methylbutyl)-1,3-oxazolidine). Wetting agents can include polyamides, polyamides having long chain fatty acid moieties, and p-Dodecylbenzenesulfonic acid (DDBSA). Defoamers can include poly(dimethylsiloxane) fluids, poly(octyl acrylates), $SiO_2$, siloxanes with a polyether terminal group, and potassium tripolyphosphate.

Due to the enhancements in processing fluoropolymer coatings of the present disclosure, it has been discovered that the amount of these additives can be reduced or eliminated from the coatings of the present disclosure as compared to fluoropolymer coatings prepared using conventional deposition, curing, and vacuum bagging methodology. In at least one aspect, a fluoropolymer layer of the present disclosure has an additive content of less than about 1 wt %, such as less than about 0.5 wt %, which saves manufacturing time and cost as compared to higher additive contents of conventional anti-ice layers; and is an amount sufficiently low to reduce or prevent accumulation of the additives at the fluoropolymer surface.

EXAMPLES

In the following examples, an aluminum rotorblade was used (and is referred to as an "airfoil").

Example 1

Surface Preparation of Airfoil: Using 3M Scotch-Brite™ 400-500 grit, the surface of the airfoil was evenly scuffed to expose the aluminum underneath. The airfoil was washed with soap and water with scrubbing to remove loose aluminum and debris left behind. After rinsing, the specimen was placed in a beaker filled with warm alkaline water containing Micro90 detergent and placed in a bath sonicator for 20 minutes. The specimen was rinsed thoroughly to remove soap and placed in a beaker of acetone and bath sonicated for 20 minutes. The airfoil was dried before placing in a nitrogen ($N_2$) filled cabinet until further use.

Surface Preparation for Spray Application: The next step in the surface preparation of the airfoil was addition of a metal adhesion promoter (3M Surface Pre-treatment AC-131 CB) to enhance the bond of an organic material to the aluminum surface. Following the manufacturer's directions, the promoter was prepared and allowed to sit for a minimum induction time of 30 minutes before spraying one pass over the surface of the airfoil. Once the AC-131 was dry (minimum 15 min but no longer than 72 h after application) the primer was applied to the airfoil. Following the manufacturer directions, CA7502 primer was prepared and allowed an induction time of 1 hour. Soon after, the primer was sprayed as a light coat (1 to 2 mil thick) over the surface of the airfoil.

Preparation of Airfoil: A fluoropolymer was dissolved in tetrahydrofuran in a plastic container. The solution was vortexed and placed in a FlackTek speedmixer at 2300 rpm for 15 seconds. The solution was transferred into a glass bottle specific for a bottom-feed Iwata airbrush. For this spray application, an Iwata Eclipse HP-BCS airbrush with a 0.5 mm needle/nozzle was used due to its ability to handle moderate to large amounts of paint. The airbrush was connected to an air compressor with a pressure of 40 psi. The airfoil was suspended on a rod (max 0.625-inch rod diameter) that was securely connected to a ring stand to allow easy accessibility to both sides of the specimen while spraying. With slow strokes parallel to the surface, each side of the airfoil was sprayed from a distance of 4 to 8 inches starting at the leading edge working down to the trailing edge. To cover one side of the airfoil with minimal spray overlap, 3 passes (pass approximately equal to the right and back) was sufficient. Once both sides were sprayed, the leading edge was covered with 1 to 2 passes. The solvent was allowed to flash off for 1 to 2 minutes before the next round of application. The speed of each stroke will determine the amount of rounds needed to obtain a 10 mil thick coating (average 8-12 rounds). Once the target thickness was reached, the airfoil was allowed to sit at ambient conditions for a minimum of 16 h to allow curing and solvent evaporation. After the 16 h period, the second 10 mil coat was applied to the airfoil following the same protocol. Again, the specimen was allowed to rest before the final cure at 80° C. for 4 h. For this fluoropolymer mixture it was discovered that spraying a coat thicker than 10 mil resulted in bubbles and cohesive failure within the film.

Free standing film: A fluoropolymer was dissolved in tetrahydrofuran in a plastic container. This solution was quickly vortexed and placed in a FlackTek speedmixer at 2300 rpm for 15 seconds. The solution was poured into a glass bottle for a bottom-feed Iwata airbrush. For this spray application, an Iwata Eclipse HP-BCS airbrush with a 0.5 mm needle/nozzle was used due to its ability to handle moderate to large amounts of paint. The fluoropolymer solution was sprayed directly on to a sheet of mylar that has been silanized. The airbrush was held at a distance of 4 to 8 inches above the mylar and sprayed in strokes parallel to the surface. The total target thickness of the film was 20 mil with a 10 mil thickness limit for each coat. The first 10 mil thick film was applied to the surface and allowed to dry for 16 h. The following day, a fresh fluoropolymer solution was sprayed onto the first coat giving a total thickness of 20 mil. The coating was allowed to cure for 16 h before a final cure at 80° C. for 4 h. The free standing film was then hot pressed at 100° C. to even the thickness.

Bonding of film to airfoil: Following the preparation of the airfoil and free standing film they were bonded together using an epoxy film adhesive (AF163-2K). A portion of the AF163-2K was cut from the stock roll sufficient to cover the area of the airfoil. The exposed side of the adhesive was placed against the free standing film ensuring all air between was removed. The protective liner on the opposite side of the adhesive was removed and positioned over the surface of the airfoil starting along the 0% chord (leading edge). The film/adhesive was gradually pressed along the surface towards the trailing edges of the sample, removing all voids. Once the adhesive was secured on the surface of the component, it was rolled against a clean flat surface before sealing the entire assembly within a vacuum bag. The assembly was then vacuum bagged using the apparatus shown in FIG. 3 (having a metal plate). A vacuum (7 to 10 psi) was applied to the bag ensuring intimate contact with the film surface of the airfoil. Once all the air was removed from the bond line the bagged sample was transferred to an oven set at 210° F. for 3 h with 2° F./min ramp to cure the adhesive. After the adhesive was cured the excess film was trimmed from the edges of the sample.

The new procedure for vacuum bagging provides a route to multiple airfoil preparations simultaneously. We have incorporated a flat metal plate into the protocol and with the use of breather material, we obtain better vacuum efficiency. Without the metal plate, the vacuum bag more freely wrapped around the airfoil creating possible voids and creases in the bag, which depending on the location of the creases and pleats effect the coating texture on the airfoil.

Example 2

Method for increasing coating thickness: a second airfoil was prepared in a similar fashion as described above but with the addition of heat during the spray process. This was accomplished by using an IR lamp that provides up to 55° C. on the component or surface being coated. The IR lamp helps to produce a smooth surface texture of the coating technology which otherwise shows a more orange peel, rippled effect. The desire to have a smooth surface texture is to improve durability against rain and sand erosion. Rough surface texture or protrusions on the coating surface accelerate erosion by providing an anchor for sand and rain to exploit. This technique shows improvements to both flat surfaces and aerospace relevant geometries. The IR lamp helps to flash organic solvent off faster allowing the coating to dry and cure. This allows the addition of more coats leading to an overall thicker coating with reduced negative effects such as voids caused by trapped solvent trying to escape. The heat also allows the coating to flow and level across the surface producing a smooth texture.

Overall, methods of the present disclosure provide smooth icephobic coatings on non-flat surfaces with improved rain and sand erosion resistance. Although discussed in the context of aviation use, other possible uses of methods of the present disclosure are contemplated, such as on wind turbine blades, in non-aerospace transportation, and in communications, including satellite dishes.

Definitions

The term "non-flat surface" includes a surface with at least some curvature. For example, in at least one aspect, a non-flat surface can have a radius of curvature (such as a minimum radius of curvature) of from about 1/16" to about 5 feet. The term "alkyl" includes a substituted or unsubstituted, linear or branched acyclic alkyl radical containing from 1 to about 20 carbon atoms. In at least one aspect, alkyl is a $C_{1-10}$alkyl, $C_{1-7}$alkyl or $C_{1-5}$alkyl. Examples of alkyl include, but are not limited to, methyl, ethyl, propyl, butyl, pentyl, hexyl, heptyl, octyl, nonyl, decyl, and structural isomers thereof.

The term "cycloalkyl" includes a substituted or unsubstituted, cyclic alkyl radical containing from 1 to about 20 carbon atoms.

The term "aryl" refers to any monocyclic, bicyclic or tricyclic carbon ring of up to 6 atoms in each ring, wherein at least one ring is aromatic, or an aromatic ring system of 5 to 14 carbons atoms which includes a carbocyclic aromatic group fused with a 5- or 6-membered cycloalkyl group. Examples of aryl groups include, but are not limited to, phenyl, naphthyl, anthracenyl, or pyrenyl.

The term "alkoxy" is RO— wherein R is alkyl as defined herein. The terms alkyloxy, alkoxyl, and alkoxy may be used interchangeably. Examples of alkoxy include, but are not limited to, methoxyl, ethoxyl, propoxyl, butoxyl, pentoxyl, hexyloxyl, heptyloxyl, octyloxyl, nonyloxyl, decyloxyl, and structural isomers thereof.

The term "heterocyclyl" refers to a monocyclic, bicyclic or tricyclic ring having up to 10 atoms in each ring, wherein at least one ring is aromatic and contains from 1 to 4 heteroatoms in the ring selected from N, O and S. Non-limiting examples of heterocyclyl include, but are not limited to, pyridyl, thienyl, furanyl, pyrimidyl, imidazolyl, pyranyl, pyrazolyl, thiazolyl, thiadiazolyl, isothiazolyl, oxazolyl, isoxazoyl, pyrrolyl, pyridazinyl, pyrazinyl, quinolinyl, isoquinolinyl, benzofuranyl, dibenzofuranyl, dibenzothiophenyl, benzothienyl, indolyl, benzothiazolyl, benzooxazolyl, benzimidazolyl, isoindolyl, benzotriazolyl, purinyl, thianaphthenyl and pyrazinyl. Attachment of heterocyclyl can occur via an aromatic ring or through a non-aromatic ring or a ring containing no heteroatoms.

The term "hydroxy" and "hydroxyl" each refers to —OH.

The term "amino" refers to a primary, secondary or tertiary amine-containing radical. An example of an amino radical is —NH2. An amino radical may be substituted with $R^4$ or $R^5$ where $R^4$ may be, for example, cyano, haloacyl, alkenylcarbonyl, hydroxyalkenylcarbonyl, am inoalkenylcarbonyl, monoalkylaminoalkenylcarbonyl, dialkylaminoalkenylcarbonyl, haloalkenylcarbonyl, cyanoalkenylcarbonyl, alkoxycarbonylalkenylcarbonyl, alkynylcarbonyl, hydroxyalkynylcarbonyl, alkylcarbonylalkenylcarbonyl, cycloalkylcarbonylalkenylcarbonyl, arylcarbonylalkenylcarbonyl, am inocarbonylalkenylcarbonyl, monoalkylaminocarbonylalkenylcarbonyl, dialkylaminocarbonylalkenylcarbonyl or alkenylsulfonyl; and $R^5$ may be, for example, H, alkyl or cycloalkyl.

Compounds of the present disclosure include tautomeric, geometric or stereoisomeric forms of the compounds. Ester, oxime, onium, hydrate, solvate and N-oxide forms of a compound are also embraced by the present disclosure. The present disclosure considers all such compounds, including cis- and trans-geometric isomers (Z- and E-geometric isomers), R- and S-enantiomers, diastereomers, d-isomers, l-isomers, atropisomers, epimers, conformers, rotamers, mixtures of isomers and racemates thereof are embraced by the present disclosure.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein. While the foregoing is directed to aspects of the present disclosure, other and further aspects of the present disclosure may be devised without departing from the basic scope thereof.

What is claimed is:

1. A method for forming a fluoropolymer coated component, comprising:
    applying an adhesion promoter onto a non-flat metal surface of a component;
    applying an organic material onto the adhesion promoter;
    forming a free standing film by applying a mixture comprising a fluoropolymer and a fluorinated solvent onto a sheet;
    disposing the free standing film and the component into a vacuum bag to form a vacuum bag assembly; and
    applying a vacuum to the vacuum bag assembly to bond the free standing film to the organic material.

2. The method of claim 1, wherein applying the adhesion promoter comprises applying the adhesion promoter onto a metal surface comprising one or more of aluminum, nickel, steel, magnesium, or titanium alloy.

3. The method of claim 1, wherein applying the adhesion promoter comprises applying an adhesion promoter that is the reaction product of acetic acid, zirconium tetra-n-propoxide, and (3-glycidyloxypropyl)trimethoxysilane.

4. The method of claim 1, further comprising curing the adhesion promoter at a temperature from about 30° C. to about 70° C.

5. The method of claim 1, wherein applying an organic material onto the adhesion promoter comprises applying an organic material that is one or more of epoxy, a polyurethane, or a fiber-reinforced plastic.

6. The method of claim 5, wherein the organic material is applied to a thickness from about 0.5 mil to about 5 mil and wherein the adhesion promoter layer is applied to a thickness from about 0.5 mil to about 5 mil.

7. The method of claim 1, wherein the fluoropolymer is selected from a fluoroacrylate, a fluorosilicone acrylate, a fluorourethane, a perfluoropolyether, a perfluoropolyoxetane, a polyvinylidenefluouride, or a perfluoroalkoxy alkane.

8. The method of claim 1, wherein the solvent is a fluorinated solvent having a boiling point from about 40° C. to about 200° C.

9. The method of claim 8, wherein the fluorinated solvent is represented by formula (I):

$$R^1-(CF_2)n-R^2 \quad (I)$$

wherein n is an integer from about 1 to about 25; $R^1$ and $R^2$ are independently —$CF_3$, hydrogen, hydroxyl, hydroxyalkyl, aminoalkyl, aminoaryl, aryloxy, alkyl, aryl, carboxylic acid groups having from about 1 to about 25 carbons, aldehyde, ketone, or —$CF_3(CF_2)q(CH_2)p$, wherein q is an integer from about 0 to about 25, and p is an integer from about 1 to about 25.

10. The method of claim 1, wherein the mixture further comprises one or more additional polymers selected from epoxies, polyacrylates, polyesters, polyethers, carbamates, or polysiloxanes.

11. The method of claim 1, wherein the mixture has a viscosity from about 0.00046 Pa*s to about 1 Pa*s at 25° C.

12. The method of claim 1, wherein applying the mixture comprises spraying the mixture onto the sheet at a pressure from about 12 psi to about 18 psi.

13. The method of claim 12, wherein applying the mixture comprises spraying multiple layers of the mixture to form a fluoropolymer layer having a thickness from about 2 mil to about 20 mil.

14. The method of claim 13, wherein the fluoropolymer layer has an average porosity from about 20% to about 70% based on the total volume of the layer.

15. The method of claim 13, wherein the fluoropolymer layer has a void density from about $10^{11}$ to about $10^{13}$ voids per $cm^3$.

16. The method of claim 13, wherein the fluoropolymer layer has an additive content of less than about 1 wt %.

17. The method of claim 1, wherein the forming the free standing film further comprises hot pressing the free standing film and the sheet.

18. The method of claim 1, wherein the free standing film and the sheet is hot pressed at a temperature from about 90° C. to about 150° C.

19. The method of claim 1, wherein the vacuum is applied to the vacuum bag assembly at a pressure from about 1 psi to about 20 psi.

20. The method of claim 1, further comprising curing the vacuum bag assembly at a temperature from about 100° F. to about 300° F. at a temperature ramp rate from about 1° F./minute to about 20° F./minute.

21. The method of claim 1, wherein the vacuum to the vacuum bag assembly forms a fluoropolymer layer having a surface roughness from about 5 microinches to about 100 microinches disposed on the non-flat metal surface of the component.

* * * * *